(12) United States Patent
Arase

(10) Patent No.: US 11,334,617 B2
(45) Date of Patent: May 17, 2022

(54) PAINT-BASED IMAGE SEARCH

(71) Applicant: MERCARI, INC., Tokyo (JP)

(72) Inventor: Kosuke Arase, Tokyo (JP)

(73) Assignee: MERCARI, INC., Tokyo (JP)

( * ) Notice: Subject to any disclaimer, the term of this patent is extended or adjusted under 35 U.S.C. 154(b) by 150 days.

(21) Appl. No.: 16/583,021

(22) Filed: Sep. 25, 2019

(65) Prior Publication Data
US 2021/0089569 A1 Mar. 25, 2021

(51) Int. Cl.
*G06F 16/538* (2019.01)
*G06T 7/11* (2017.01)
*G06F 16/583* (2019.01)

(52) U.S. Cl.
CPC .......... *G06F 16/538* (2019.01); *G06F 16/583* (2019.01); *G06T 7/11* (2017.01); *G06T 2207/20132* (2013.01)

(58) Field of Classification Search
CPC ............. G06T 2207/20132; G06T 7/11; G06F 16/583; G06F 16/538
See application file for complete search history.

(56) References Cited

U.S. PATENT DOCUMENTS

| | | | | |
|---|---|---|---|---|
| 9,779,448 B2* | 10/2017 | Patel | ................... | G06F 3/04842 |
| 10,785,407 B2* | 9/2020 | Lertsumruaypun | ..... | G06F 21/32 |
| 10,817,742 B2* | 10/2020 | Yamaguchi | ........ | G06K 9/00671 |
| 10,861,129 B2* | 12/2020 | Song | ....................... | G06K 9/629 |
| 2012/0062597 A1* | 3/2012 | Mori | ......................... | G06T 7/33 |
| | | | | 345/636 |
| 2012/0169759 A1* | 7/2012 | Patil | ..................... | G06T 11/001 |
| | | | | 345/594 |
| 2012/0170840 A1* | 7/2012 | Caruso | ..................... | G01J 3/52 |
| | | | | 382/165 |
| 2012/0224768 A1* | 9/2012 | Lee | ..................... | G06F 16/5838 |
| | | | | 382/165 |
| 2015/0015598 A1* | 1/2015 | Lichman | .............. | G06T 11/001 |
| | | | | 345/594 |
| 2015/0023596 A1* | 1/2015 | Oami | ................... | G06K 9/3241 |
| | | | | 382/173 |
| 2019/0332849 A1* | 10/2019 | Gupta | ................ | G06K 9/00275 |
| 2020/0104632 A1* | 4/2020 | Liu | ....................... | G06K 9/6202 |
| 2021/0334870 A1* | 10/2021 | Barone | ................... | G06T 19/20 |

* cited by examiner

*Primary Examiner* — Mia M Thomas
(74) *Attorney, Agent, or Firm* — Morgan, Lewis & Bockius LLP

(57) ABSTRACT

Technologies generally described herein relate to a computing device for an image search. Example computing devices may include at least one processor and at least one memory storing instructions. The at least one processor may execute the instructions to perform operations. The operations may include obtaining an input image including at least one object that is a target for a search; displaying the input image on a display screen associated with the computing device; receiving an operation to paint the at least one object in the displayed input image to generate region data for at least one painted region; and displaying, on the display screen, one or more search results by an image search conducted based, at least in part, on the input image and the region data.

16 Claims, 19 Drawing Sheets

PAINT-BASED IMAGE SEARCH

BACKGROUND

Unless otherwise indicated herein, the approaches described in this section are not prior art to the claims in this application and are not admitted to be prior art by inclusion in this section.

Recently, image search services on a user device have been increased. In such image search, a query image may include multiple objects, or a target for the image search may be in a part of the query image. In order to specify the search target, the image search services usually provide an adjustable rectangle displayed on the query image so that a user can adjust the rectangle to choose an area that covers the whole search target in the query image. After the rectangle is adjusted, the user device crops the query image with the adjusted rectangle to obtain a cropped image for use in the image search. However, the cropped image may include a background around the search target when the search target is not rectangular, and thus, search results can be affected by the background. Further, when the search target includes two or more objects, such as a pair of shoes, the user may have to specify only one from the multiple objects with a small rectangle or to apply a large rectangle that covers all the multiple objects. In either way, however, the search results may not be satisfactory to the user. Meanwhile, the user device may neither be able to distinguish a foreground and a background nor be able to determine inclusion relations in the adjusted rectangle. For example, when a rectangle is located on an upper body of a person who is wearing a cardigan on a T-shirt, it is difficult to determine with the rectangular-based approach as described above whether the user wishes to specify the cardigan or the T-shirt as a search target.

SUMMARY

Technologies generally described herein relate to an image search.

Various example methods using one or more computing devices are described. Example methods may include displaying, using one or more computing devices, an input image including at least one object; receiving, using the one or more computing devices, an operation to paint the at least one object in the displayed input image to generate region data for at least one painted region; preprocessing, using the one or more computing devices, the input image and the region data to produce preprocessed data; and conducting, using the one or more computing devices, a search of an image database based, at least in part, on the preprocessed data. In some examples, the receiving of the operation includes determining end of the operation based, at least in part, on a user input. In some examples, the preprocessing may include refining, using the one or more computing devices, the region data to produce refined region data. The preprocessing may further include at least one of eliminating, using the one or more computing devices, background of the refined region data; extracting, using the one or more computing devices, at least one feature data from the input image based, at least in part, on the refined region data; and transforming, using the one or more computing devices, the at least one feature data to produce the preprocessed data.

In some examples, computing devices for an image search are described. Example computing devices may include at least one processor and at least one memory. The at least one memory may store instructions. The at least one processor executes the instructions to perform operations. The operations may comprise obtaining an input image including at least one object that is a target for a search; displaying the input image on a display screen associated with the computing device; receiving an operation to paint the at least one object in the displayed input image to generate region data for at least one painted region; and displaying, on the display screen, one or more search results by an image search conducted based, at least in part, on the input image and the region data. In some examples, the operations may further comprise preprocessing the input image and the region data to produce preprocessed data. In some examples, the preprocessing may include refining the region data to produce refined region data. The preprocessing may further include at least one of eliminating background of the refined region data; extracting at least one feature data from the input image based, at least in part, on the refined region data; and transforming the at least one feature data to produce the preprocessed data.

In some examples, a non-transitory computer-readable storage medium is described. The example non-transitory computer-readable storage medium may store instructions executable by a computing device to cause the computing device to perform operations. The operations may include displaying an input image including at least one object that is a target for a search; receiving an operation to paint the at least one object in the displayed input image to generate region data for at least one painted region; preprocessing the input image and the region data to produce preprocessed data; and displaying one or more search results by an image search conducted based, at least in part, on the preprocessed data. In some examples, the receiving of the operation includes determining end of the operation based, at least in part, on a user input. In some examples, the preprocessing may include refining the region data to produce refined region data. The preprocessing may further include eliminating background of the refined region data; extracting at least one feature data from the input image based, at least in part, on the refined region data; and transforming the at least one feature data to produce the preprocessed data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
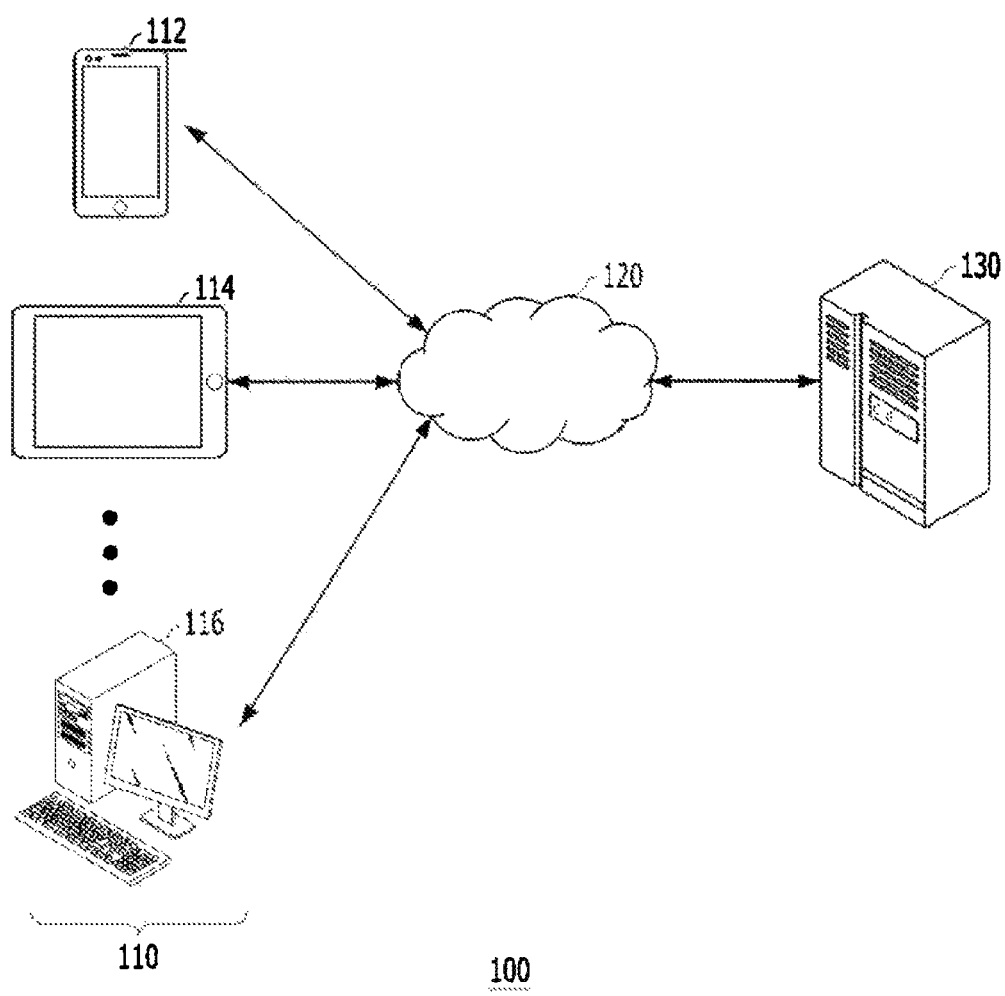
FIG. 1 shows a diagram of an example image search system where a user device is configured to communicate with a server via a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to an image search.

Briefly stated, technologies are generally described for searching images using a user input of a paint operation received on a user device. In various examples, a user may want to search, using a user device, a certain object shown in an input image. The user device may display, on a display screen, the input image including at least one object that is a search target. The input image may be captured by a camera associated with the user device, read from a memory of the user device, or retrieved through a network, such as the Internet. The user may paint the search target in the displayed input image using an input means. In an example, the user may paint the search target on the display screen, which is configured to receive a touch input, using his/her finger. In another example, the user may paint the search target using a peripheral device, such as a mouse and a stylus pen. In response to such user's operation to paint the search target, the user device may receive the operation and generate region data for at least one painted region.

In some examples, the user device may perform at least one preprocess of the input image and the region data to produce preprocessed data. The at least one preprocess may include, among others, extraction of at least one feature data from the input image based on the region data. The user device may transmit the preprocessed data to a server via a network, and the server may conduct a search of an image database for one or more images that match the preprocessed data. The server may transmit, to the user device, one or more search results obtained from the search of the image database, and the user device may receive the one or more search results and display them on its display screen. Although the preprocess and the search are described to be performed by the user device and the server, respectively, in the above, it may also be possible that the preprocess is performed by the server and/or the search is performed by the user device depending on desired configurations.

FIG. 1 shows a diagram of an example image search system where a user device is configured to communicate with a server via a network, arranged in accordance with at least some embodiments described herein. As depicted, an image search system 100 may include a user device 110, a network 120 and a server 130. User device 110 may be any type of computing device, such as user device 112, 114, . . . or 116, that is configured to run, execute, or operate an application program including instructions in accordance with the present disclosure and configured to display an input image and one or more search results.

User device 110 may download the application program via network 120 from server 130 and/or other external devices (not shown), for example, an application providing server, such as Play Store®, App Store®, etc. Various types of user device 110 may include, but are not limited to, a desktop computer, a mobile computer (e.g., a laptop, a ultra-book), a mobile phone, a smart phone, a tablet, a smart television, a smart watch, a display screen, a personal digital assistant (PDA), smart furniture, a smart household device, a smart vehicle, a smart transportation device, and/or a smart accessory.

User device 110 may access server 130 via network 120. Network 120 may be any wired network, wireless network, or combination thereof. In addition, network 120 may include, but not limited to, a personal area network, a local area network, a wide area network, an over-the-air broadcast network (e.g., for radio or television), a cable network, a satellite network, a cellular telephone network, or combination thereof. For example, network 120 may be a publicly accessible network of linked network, possibly operated by various distinct parties, such as the Internet. In some embodiments, network 120 may be a private or semi-private network, such as a corporate or university intranet. Network 120 may include one or more wireless networks, such as a Global System for Mobile Communications (GSM) network, a Code Division Multiple Access (CDMA) network, a Long Term Evolution (LTE) network, a Long Term Evolution-Advanced (LTE-A) network, Interoperability for Microwave Access (WiMax) network, Wireless Fidelity (Wi-Fi) network and any other type of wireless network. For example, the protocols used by network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Server 130 may be implemented as a single computing device, a server farm comprising multiple servers, a distributed network, a cloud-computing configuration, and/or the like. Server 130 may comprise one or more processors and a memory.

In some embodiments, user device 110 may be configured to obtain an input image, which is a query image for an image search. In some examples, user device 110 may capture the input image by a camera associated with user device 110. In some other examples, user device 110 may read the input image from a local memory of user device 110. Otherwise, user device 110 may retrieve the input image through network 120 (e.g., the Internet). The input image may include at least one object that is a search target.

User device 110 is configured to display the input image on a display screen associated with user device 110. Further, user device 110 may be configured to receive an operation to paint the at least one object in the displayed input image. User device 110 may receive the user's paint operation through an input means including, for example but not limitation, a touch screen, buttons, a keyboard, a mouse, a stylus pen, a track-pad, etc. When receiving the paint operation, user device 110 may determine end of the paint operation based on a user input. In some examples, the user may touch or click a button to stop the paint operation and/or another button to start an image search, and user device 110 may determine the end of the paint operation when such user input is received. However, the determination of the end of the paint operation is not limited thereto and other examples for improving the user experience are also available. For example, user device 110 may use a timer, detect a predetermined user's gesture, detect end of one stroke of user input, etc. to determine the end of the paint operation. After determining the end of the paint operation, user device 110 may generate region data for the at least one painted region using the received paint operation.

In some embodiments, user device 110 may be configured to preprocess the input image and the region data to produce preprocessed data. The preprocessed data may include at least one of, for example, vectors, graphs and images. In some examples, user device 110 may be configured to extract at least one feature data from the input image based, at least in part, on the region data. The at least one feature data may include a set of decimal fractions extracted from the input image. In some examples, before extracting the at least one feature data, user device 110 may be configured to refine the region data to produce refined region data and/or eliminate background of the refined region data. In some examples, after extracting the at least one feature data, user device 110 may be configured to transform the at least one feature data to produce the preprocessed data suitable for an image search. In some examples user device 110 may be configured to transmit, via networks 120, the preprocessed data to server 130 for its image search. In some examples, user device 110 may be configured to temporarily store at least one of the input image and the region data.

In some other embodiments, user device 110 may transmit, to server 130, the region data without the preprocess. Server 130 may be configured to receive the region data and obtain the input image. In some examples that the input image is located in user device 110, user device 110 may transmit, to server 130, the input image as well as the region data. In some other examples that the input image has been retrieved via network 120, server 130 may also retrieve the input image via network 120. Then, server 130 may preprocess the input image and the region data to produce preprocessed data.

In some embodiments, server 130 may be configured to conduct a search of an image database based on the preprocessed data that is obtained from the input image and the region data. The image database may be included in server 130 and/or in other computing devices communicatively connected to server 130. Then, server 130 may obtain and transmit one or more search results to user device 110. User device 110 may be configured to display the received one or more search results on the display screen associated with user device 110. In some examples, server 130 may be configured to store at least one of the input image, the region data and the one or more search results.

In some other embodiments, user device 110 may be configured to conduct the image search. In these cases, user device 110 may be equipped with its own image database or connected to another computing device comprising an image database, such as, for example, server 130. Further, the above-described preprocesses may be performed in user device 110 or in server 130 depending on desired configurations.

As described with regard to FIG. 1, the user can instinctively specify the search target in the displayed input image by painting it, thereby allowing the user to experience a fast and convenient image search. Further, the user is able to paint two or more separated objects for the image search, and thus the user device or the server can distinguish the search target including multiple objects (e.g., a pair of shoes) and also distinguish the search target that is overlapped on or under another object (e.g., a cardigan on a T-shirt) from the input image. Meanwhile, by painting the search target, the separation between foreground and background for the image search can be explicitly achieved, and thus the results of the image search can be less affected by the background.

Figure 2:
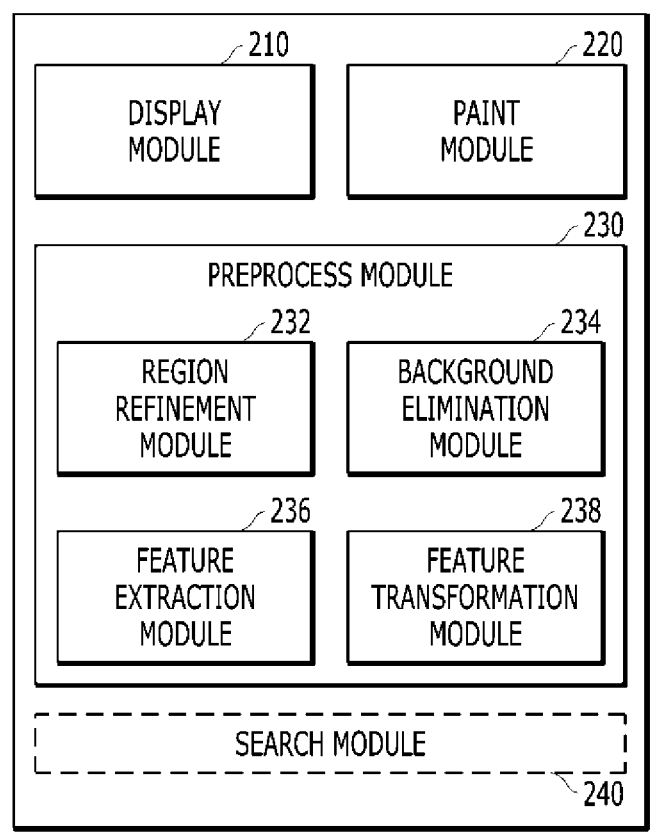
FIG. 2 shows a block diagram of an example user device, arranged in accordance with at least some embodiments described herein.

FIG. 2 shows a block diagram of an example user device, arranged in accordance with at least some embodiments descried herein. As illustrated, a user device 200 may include a display module 210, a paint module 220 and a preprocess module 230 operatively coupled to each other or otherwise in communication with each other. Additionally or optionally, user device 200 may further include a search module 240. In some embodiments, user device 200 may be any suitable type of computing device configured to run, execute, or operate an application program including instructions in accordance with the present disclosure. The configuration of user device 200 as illustrated in FIG. 2 may be an example of user device 112, 114, . . . , or 116 as illustrated in FIG. 1.

In some embodiments, user device 200 may obtain an input image including at least one object that is a target for an image search. In some examples, user device 200 may capture the input image using a camera (not shown) of user device 200; read the input image from a local memory (not shown) of user device 200; and/or retrieve the input image through a network (e.g., the Internet). Display module 210 may be configured to present the input image on at least one display screen operatively connected with user device 200.

Paint module 220 may be configured to receive an operation to paint the at least one object in the displayed input image. In some examples, a user may perform the paint operation using an input means including, for example but not limitation, a touchscreen, buttons, a keyboard, a mouse, a track-pad, a stylus pen, etc., which may be operatively connected with user device 200. During receiving the paint operation, paint module 220 may determine end of the paint operation based on a user input. In some examples, paint module 220 may determine the end of the paint operation when the user pushes a button, such as a "search" button or a "stop" button displayed on the display screen. In some other examples, paint module 220 may determine the end of the paint operation when a predetermined period of time has passed, when a predetermined user's gesture is detected, when end of one stroke of the user input is detected, or the likes.

Paint module 220 may be configured to generate region data for at least one painted region based on the paint operation. In some examples, the region data may be, for example, user-drawing on a blank image that has the same size of the input image. In some other examples, the region data may be represented in pixel vectors.

Preprocess module 230 may be configured to preprocess the input image and the region data to produce preprocessed data. The preprocessed data may include at least one of, for example, vectors, graphs and images. Preprocess module 230 may include at least one of a region refinement module 232, a background elimination module 234, a feature extraction module 236 and a feature transformation module 238.

Region refinement module 232 may be configured to refine the region data to produce refined region data. In some examples, region refinement module 232 may be configured to segment the input image into a plurality of segments. The segmentation may be performed, for example, using at least one of colors, brightness, chroma, patterns of the input image and pixel values and/or using any other suitable algorithm, such as a graph cut algorithm. Region refinement module 232 may be configured to select one or more of the plurality of segments based on the region data to produce the refined region data. For example, if the proportion of a segment that is painted by the paint operation exceeds a predetermined threshold value, region refinement module 232 may select the segment. In a similar manner, region refinement module 232 may select one or more segments among the plurality of segments. Then, region refinement module 232 may determine a portion of the input image corresponding the selected one or more segments as the refined region data.

Background elimination module 234 may be configured to eliminate background of the refined region data. In some examples, background elimination module 234 may be configured to select a minimum area, such as a rectangle that covers all of the painted regions and to crop an image region corresponding to the selected minimum area. The size of the minimum area may be smaller than the image size of the input image, and it may be set to include a possible margin therein to ensure that the minimum area encompasses the whole painted regions for image processing, such as feature extraction, which will be described below. Then, background elimination module 234 may be configured to mask pixels in at least one non-painted region of the cropped image region. In some examples, background elimination module 234 may mask the pixels with a random value.

Feature extraction module 236 may be configured to extract at least one feature data from the input image based, at least in part, on the region data. In cases where the region refinement and background elimination are performed as described above, feature extraction module 236 may extract the at least one feature data from the input image using the refined region data after the region refinement and background elimination. In some examples, feature extraction module 236 may extract the at least one feature data using a convolutional neural networks (CNN). Further, the at least one feature data may include a set of decimal fractions extracted from the input image. In some examples, feature extraction module 236 may comprise multiple feature extraction modules. By way of example, but not limitation, each of the multiple feature extraction modules may extract feature data with its own feature extractor, and all the extracted feature data may be concatenated in feature extraction module 236. Alternatively or additionally, feature extraction module 236 may hierarchically extract the at least one feature data. By way of example, but not limitation, feature extraction module 236 may include a first feature extractor module and a second feature extractor module, and the first feature extractor module may extract a raw feature vector and the second feature extractor module may extract more sophisticated vectors using the raw feature vector.

Feature transformation module 238 may be configured to transform the at least one feature data extracted by feature extraction module 236 to produce the preprocessed data that is suitable for an image search. In some cases, the extracted feature data may be neither sufficient nor practical for the image search, and thus it may be necessary for feature transformation module 238 to transform the at least one feature data using any suitable techniques, such as, for example, coding and pooling procedures. In some examples, as a coding procedure, feature transformation module 238 may project the at least one feature data into high dimensional spaces to obtain at least one coded feature data. One example of the coding procedure is Bug of Visual Words (BoVW) as described in "CSURKA, Gabriella, et al. Visual categorization with bags of keypoints. In: Workshop on statistical learning in computer vision, ECCV. 2004. P. 1-2." Further, feature transformation module 238 may perform a pooling procedure to the at least one coded feature data to obtain at least one global feature data. For example, the pooling procedure may include an average pooling that calculates the average value of feature vectors and/or a max pooling that chooses the maximum values for each element of vectors. Additionally or optionally, when applying the pooling procedure, feature transformation module 238 may add location information of each feature vector using a procedure, such as, for example, a spatial pyramid as described in "LAZEBNIK, Svetlana; SCHMID, Cordelia; PONCE, Jean. Beyond bags of features: Spatial pyramid matching for recognizing natural scene categories. In: 2006 IEEE Computer Society Conference on Computer Vision and Pattern Recognition (CVPR'06). IEEE, 2006. p. 2169-2178."

As described above, the input image and the region data may be preprocessed by region refinement module 232, background elimination module 234, feature extraction module 236 and feature transformation module 238 to generate the preprocessed data. In some embodiments, preprocess module 230 may not include one or more of region refinement module 232, background elimination module 234, feature extraction module 236 and feature transformation module 238. For example, preprocess module 230 may include feature extraction module 236 only to generate the preprocessed data. In some other embodiments, user device 200 may not include preprocess module 230. In such cases, user device 200 may transmit the region data generated by paint module 220 to another computing device (e.g., server 130 in FIG. 1) for its preprocess.

The generated preprocessed data may be used as a search query. In some embodiments, after generating the preprocessed data, user device 200 may transmit it to a server (e.g., server 130 in FIG. 1) via a network as a search query. Then, the server may conduct an image search using the preprocessed data as a search query to produce one or more search results, which will be provided to user device 200. In some other embodiments, search module 240 in user device 200 may conduct the image search to produce the one or more search results. User device 200 may store at least one of the input image, the region data and the one or more search results. Display module 210 may present the one or more search results to the user on the one display screen operatively connected with user device 200.

Figure 3:
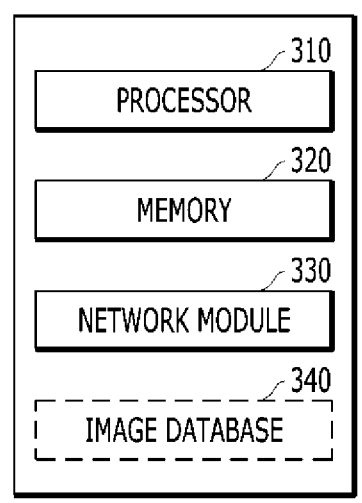
FIG. 3 shows a block diagram of an example server, arranged in accordance with at least some embodiments described herein.

FIG. 3 shows a block diagram of an example server, arranged in accordance with at least some embodiments described herein. As illustrated, a server 300 may include a processor 310, a memory 320 and a network module 330 operatively coupled to each other or otherwise in communication with each other. Additionally, server 300 may include an image database 340. Server 300 may be implemented as a single computing device, a server farm comprising multiple servers, a distributed network, a cloud-computing configuration, and/or the like.

Depending on desired configurations, processor 310 may include one or more processors and memory 320 may include one or more memories. Processor 310 may be configured to execute instructions stored in memory 320 to perform operations in accordance with the present disclosure, and memory 320 may be configured to store the instructions for an image search.

In some embodiments, network module 330 may be configured to exchange data with a user device (such as, for example, user device 110 in FIG. 1 or user device 200 in FIG. 2) via a network (such as, for example, network 120 in FIG. 1). In some embodiments, the user device may display an input image including at least one object, which is a search target; receive a user operation to paint the at least one object in the displayed input image; and generate region data for at least one painted region, based on the user operation. Network module 330 may be configured to receive the region data from the user device. Further, network module 330 may be configured to obtain the input image. In some examples that the input image is located in the user device, network module 330 may receive the input image from the user device. In some other examples that the user device retrieves the input image from the network, network module 330 may also retrieve the input image from the network.

Processor 310 may be configured to preprocess the input image and the region data to produce preprocessed data. In some examples, processor 310 may be configured to perform at least one of a region refinement, a background elimination, a feature extraction and a feature transformation. These one or more preprocesses performed by server 300 (i.e., processor 310) are similar to those performed in user device 200 (i.e., preprocess module 230) described with regard to FIG. 2, and thus their detailed descriptions are omitted. The preprocessed data may include at least one of, for example, vectors, graphs and images.

In some other embodiments, network module 330 may be configured to receive preprocessed data from the user device. In such cases, processor 310 does not perform the one or more preprocesses, and memory 320 may be configured to store the preprocessed data.

Processor 310 may be configured to conduct a search using the preprocessed data as a search query. In some embodiments, server 300 may include image database 340. Image database 340 may store a plurality of images or one or more feature data extracted therefrom, one or more of which include an object image or one or more feature data extracted therefrom that is the same with or similar to the search target. Any conventional or available search algorithm may be used for the image search, and thus its detailed descriptions are omitted in this disclosure. Based on the preprocessed data, processor 310 may generate one or more search results that are selected from the plurality of images stored in image database 340. In some examples, memory 320 may be configured to store at least one of the input image, the region data and the one or more search results. Network module 330 may transmit the one or more search results to the user device so that the user device may display the results on its display screen.

Figure 4:
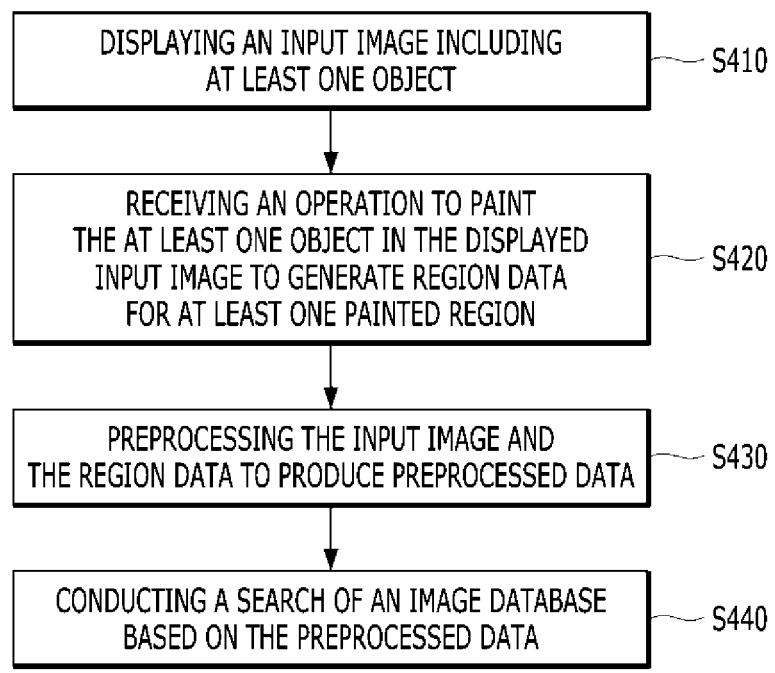
FIG. 4 illustrates an example flow diagram of a process for an image search, arranged in accordance with at least some embodiments described herein.

FIG. 4 illustrates an example flow diagram of a process for an image search, arranged in accordance with at least some embodiments described herein. A process 400 of FIG. 4 may be implemented using one or more computing devices, such as, for example, user device 110 or 200 described with reference to FIGS. 1 and 2 and/or server 130 or 300 described with reference to FIGS. 1 and 3. Further, in the below, process 400 is described in more details with reference to FIGS. 5A-5C and 6, which show illustrative examples.

Process 400 may include one or more operations, actions, or functions as illustrated by one or more of blocks S410, S420, S430, and/or S440. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 400 may begin at block S410, "DISPLAYING AN INPUT IMAGE INCLUDING AT LEAST ONE OBJECT."

Figure 5A:
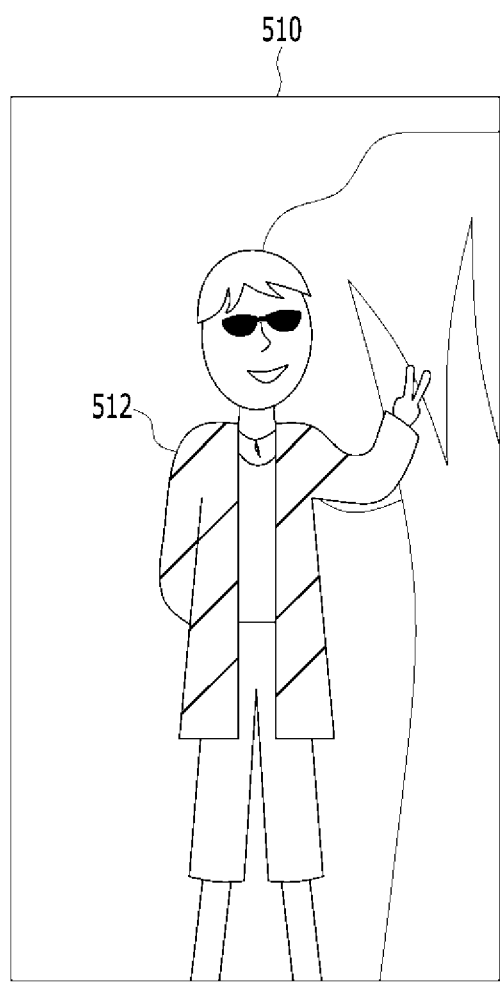
FIG. 5A shows an example input image and FIGS. 5B and 5C show illustrative examples of painting at least one region for an image search, arranged in accordance with at least some embodiments described herein.

At block S410, the one or more computing devices may display an input image including at least one object. The at least one object may be a search target. In some examples, the one or more computing devices may obtain the input image through various ways as described above. Then, the one or more computing devices may display the input image on a display screen associated with the one or more computing devices. FIG. 5A shows an example input image. In FIG. 5A, an input image 510 may be displayed on a display screen associated with a computing device, such as, for example, user device 110 or 200 illustrated in FIG. 1 or 2. Input image 510 may include a jacket 512 that is a search target. Block S410 may be followed by block S420, "RECEIVING AN OPERATION TO PAINT THE AT LEAST ONE OBJECT IN THE DISPLAYED INPUT IMAGE TO GENERATE REGION DATA FOR AT LEAST ONE PAINTED REGION."

Figure 5B:
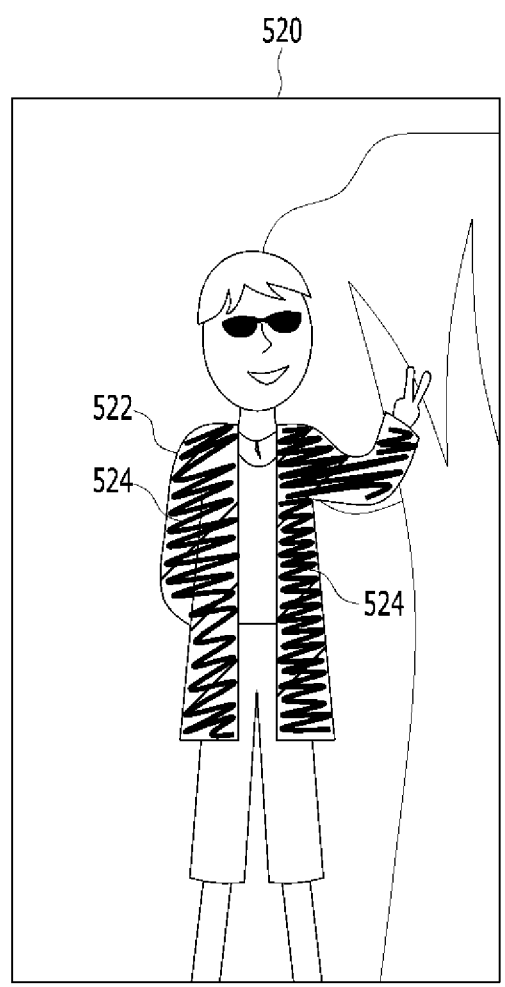
Figure 5C:
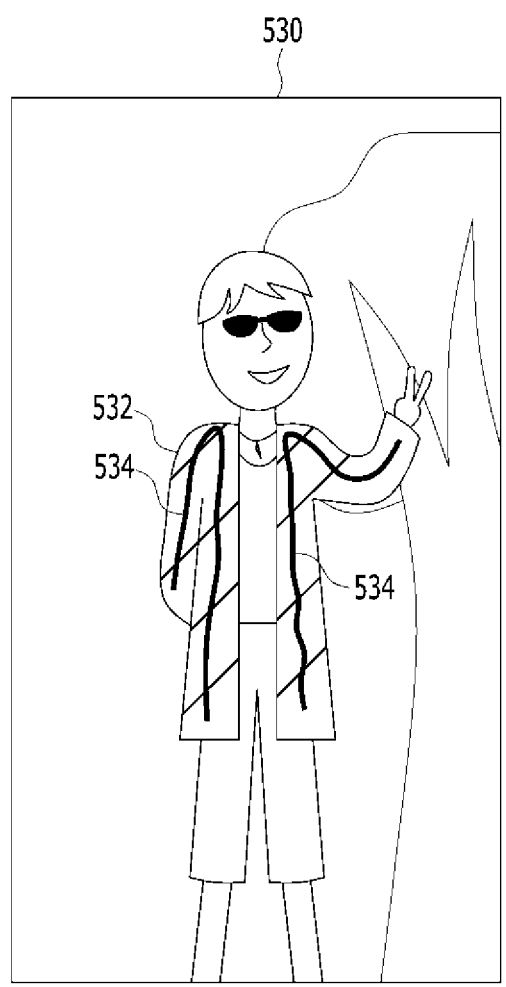

At block S420, the one or more computing devices may receive, from a user, an operation to paint the at least one object in the displayed input image. The user may paint the at least one object using an input means, and the one or more computing devices may receive the paint operation. FIGS. 5B and 5C show illustrative examples of painting the at least one object for the image search. As depicted in FIGS. 5B and 5C, an image 520 or 530 may be displayed on a display screen and may include a jacket 522 or 532 that is a search target. In FIG. 5B, the user may paint a substantially whole region 524 of jacket 522 using any suitable input means.

More typically, the user may paint a partial region 534 of jacket 532 as shown in FIG. 5C. However, it should be understood by those skilled in the art that non-described ways of painting an object to specify a search target are also possible without departing from the spirit of the present disclosure.

Figure 6:
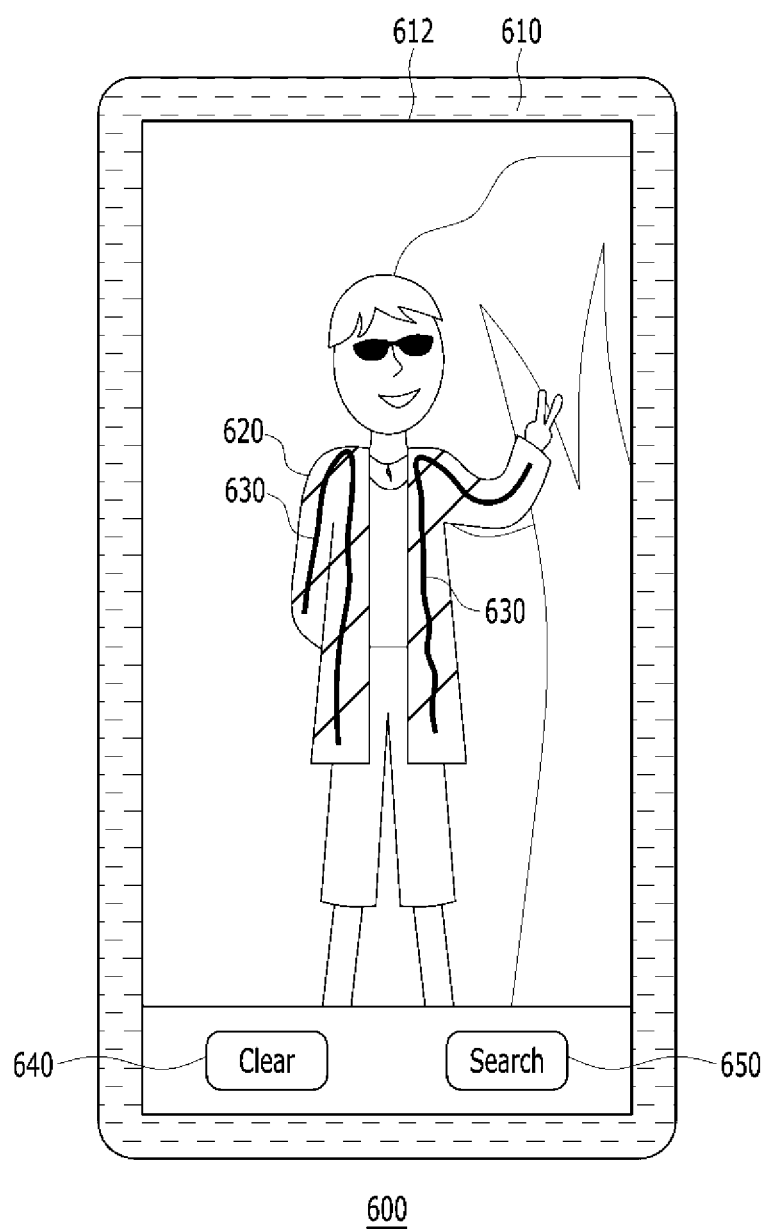
FIG. 6 shows an illustrative example of a user device configured to receive a paint operation from a user, arranged in accordance with at least some embodiments described herein.

Referring back to block S420 in FIG. 4, while receiving the paint operation, the one or more computing devices may determine the end of the paint operation based on a predetermined condition. A non-limiting example for the determination is provided with reference to FIG. 6. FIG. 6 shows an illustrative example of a user device as an example of the one or more computing devices, where the user device is configured to receive a paint operation from a user. A user device 610 may include a display screen 612 with a touch screen. User device 610 may display an input image including a jacket 620 that is a search target. The user may paint at least one region 630 on jacket 620 displayed in displayed screen 612. Display screen 612 may provide a "clear" button 640 to clear a user operation, such as painted region 630, and a "search" button 650 to stop the paint operation. When the user pushes "search" button 650, user device 610 may determine the end of the paint operation. Upon determining the end of the paint operation, the one or more computing devices may generate region data for at least one region painted by the user. Block S420 may be followed by block S430, "PREPROCESSING THE INPUT IMAGE AND THE REGION DATA TO PRODUCE PREPROCESSED DATA."

At block S430, the one or more computing devices may preprocess the input image and the region data to produce preprocessed data. The preprocessed data may include at least one of, for examples, vectors, graphs and images. In some examples, the one or more computing devices may extract at least one feature data from the input image and the region data. Further, the one or more computing devices may refine the region data to produce refined region data, eliminate background of the refined region data and/or transform the at least one feature data to produce the preprocessed data. Block S430 may be followed by block S440, "CONDUCTING A SEARCH OF AN IMAGE DATABASE BASED ON THE PREPROCESSED DATA."

At block S440, the one or more computing devices may conduct an image search of an image database using the preprocessed data as a search query. The image database may store a plurality of images or one or more feature data extracted therefrom, one or more of which include an object image or one or more feature data extracted therefrom that is the same with or similar to the search target. Any conventional or available search algorithm may be used for the image search, and thus its detailed descriptions are omitted in this disclosure. The one or more computing devices may obtain one or more search results by the image search. In some examples, the one or more computing devices may store at least one of the input image, the generated region data and the one or more search results. The obtained search results may be provided to the user on a display screen associated with the one or more computing devices.

Figure 7:
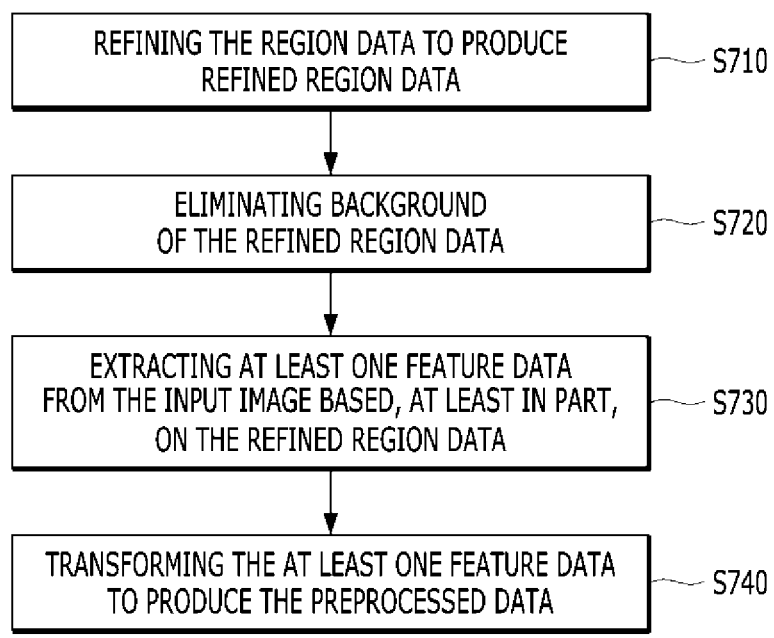
FIG. 7 illustrates an example flow diagram of a process to preprocess an input image and region data, arranged in accordance with at least some embodiments described herein.

FIG. 7 illustrates an example flow diagram of a process to preprocess an input image and region data, arranged in accordance with at least some embodiments described herein. A process 700 of FIG. 7 may be implemented using one or more computing devices, for example, user device 110 or 200 described with reference to FIGS. 1 and 2 and/or server 130 or 300 described with reference to FIGS. 1 and 3. Process 700 may be one example of block S430 as illustrated in FIG. 4.

Process 700 may include one or more operations, actions, or functions as illustrated by one or more of blocks S710, S720, S730, and/or S740. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 700 may begin at block S710, "REFINING THE REGION DATA TO PRODUCE REFINED REGION DATA."

Figure 8:
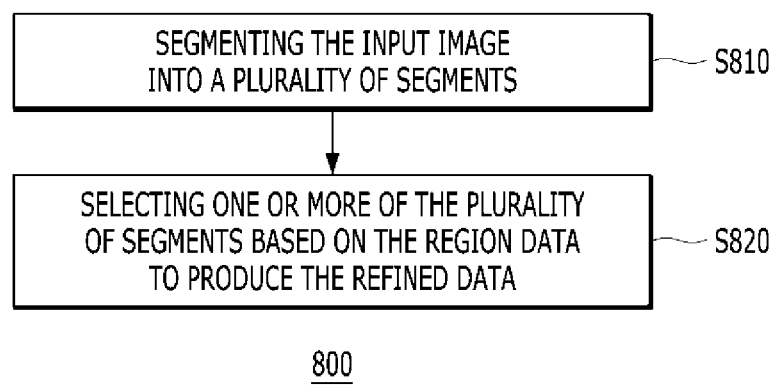
FIG. 8 illustrates an example flow diagram of a process to refine region data, arranged in accordance with at least some embodiments described herein.

At block S710, the one or more computing devices may refine the region data, which is generated from a user operation to paint at least one object in an input image displayed on the one or more computing devices. A detailed example explaining the refining of the region data is described with reference to FIG. 8 below. FIG. 8 illustrates an example flow diagram of refining the region data, arranged in accordance with at least some embodiments described herein. A process 800 of FIG. 8 may be implemented using one or more computing devices, for example, user device 110 or 200 described with reference to FIGS. 1 and 2 and/or server 130 or 300 described with reference to FIGS. 1 and 3. Process 800 of FIG. 8 may begin at block S810, "SEGMENTING THE INPUT IMAGE INTO A PLURALITY OF SEGMENTS."

Figure 9A:
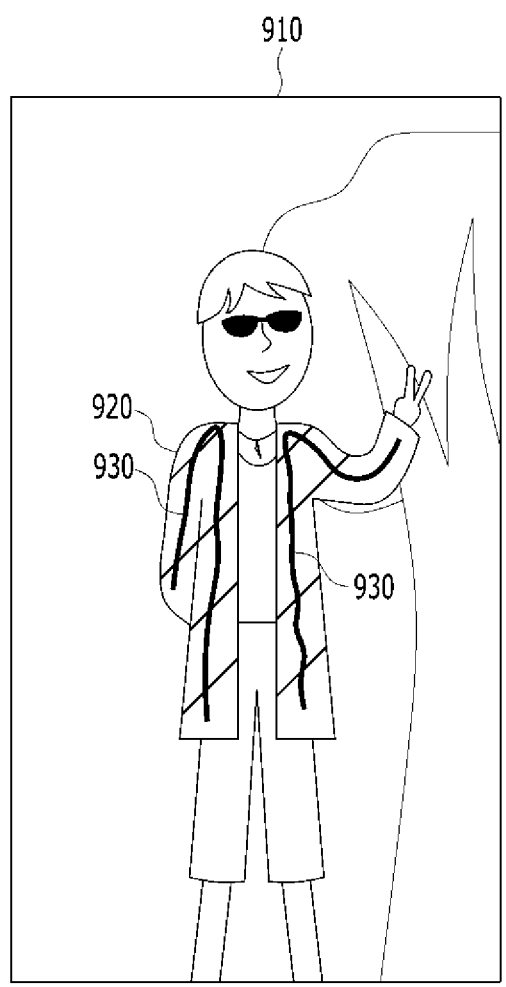
FIGS. 9A-9C show illustrative examples of refining the region data in accordance with the example flow diagram of FIG. 8.
Figure 9B:
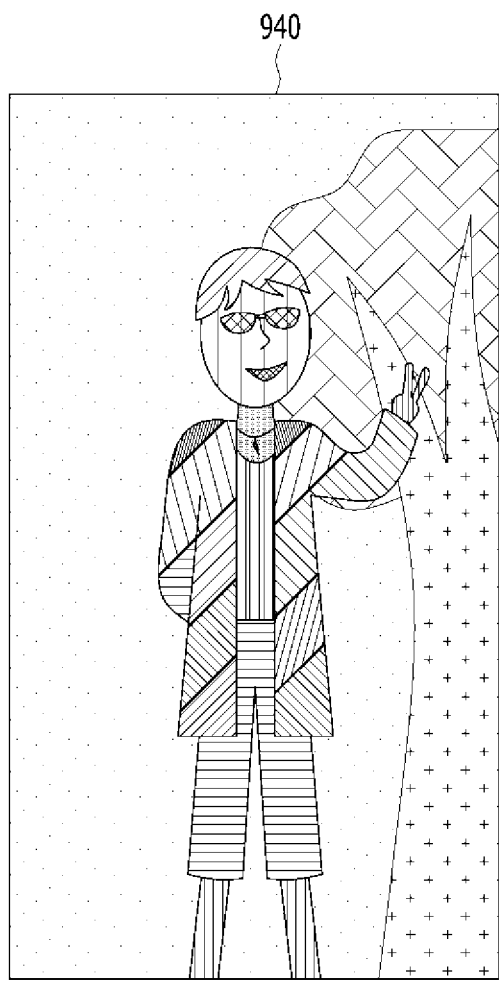

At block S810, the one or more computing devices may segment the input image into a plurality of segments. The segmentation may be performed, for example, using at least one of colors, brightness, chroma, patterns of the input image and pixel values and/or using any other suitable algorithm, such as a graph cut algorithm. As a non-limiting example, the segmentation is described in more details with reference to illustrative examples of FIGS. 9A-9C. FIG. 9A shows an illustrative example of user's painting of at least one region for an image search. As depicted in FIG. 9A, an image 910, which is displayed on a display screen, may include a jacket 920 that is a search target. The user, who wishes to search one or more images corresponding to jacket 920, may paint jacket 920 using any suitable input means on displayed image 910, and the one or more computing devices may generate at least one painted region 930. For examples, as shown in FIG. 9A, jacket 920 has stripes, which make multiple sections in image 910, and the user may draw a line to pass over each of the multiple sections. FIG. 9B shows an illustrative example of segmenting the input image. As depicted in FIG. 9B, the input image may be segmented into a plurality of segments 940, each of which is a small region shown in a different pattern. As such, input image 910 may be divided into multiple segments 940 for the refinement of the region data. Block S810 may be followed by block S820, "SELECTING ONE OR MORE OF THE PLURALITY OF SEGMENTS BASED ON THE REGION DATA TO PRODUCE THE REFINED DATA."

Figure 9C:
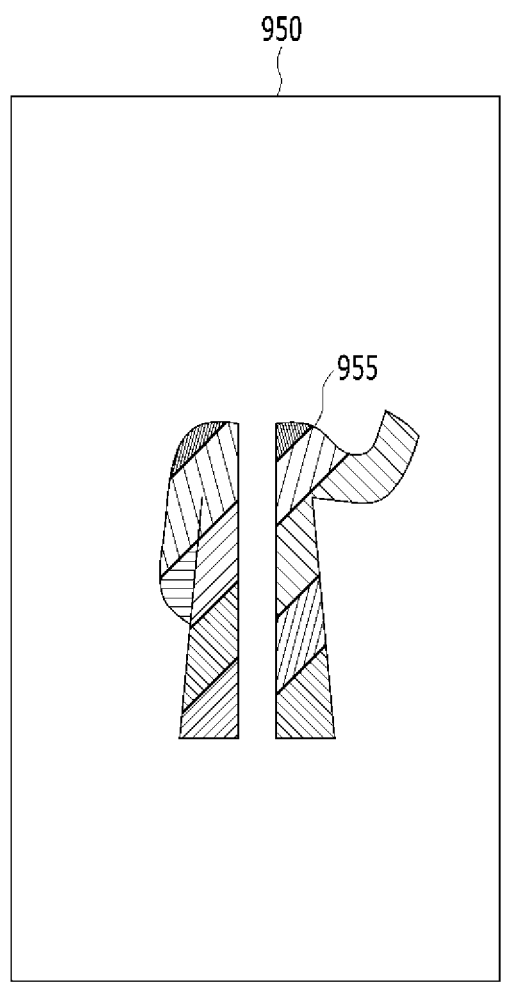

At block S820, the one or more computing devices may select one or more of the plurality of segments based on the region data to produce the refined region data. By way of example but not limitation, if the proportion of a segment that is painted by the user exceeds a predetermined threshold value, such segment may be selected by the one or more computing devices. The one or more computing devices may aggregate selected segments to produce the refined region data. The refined data is described in more details with reference to an illustrative example of FIG. 9C. FIG. 9C shows an illustrative example of selecting the one or more segments to produce the refined region data. Based on at least one painted region 930 in FIG. 9A and multiple segments 940 in FIG. 9B, the one or more computing devices may select the one or more segments 955 and produce the refined region data 950.

While process 800 of FIG. 8 has been described above with reference to blocks S810 and S820, the embodiments described herein are not limited thereto, and one or more blocks may be omitted, modified, or switched without departing from the spirit of the present disclosure.

Figure 10:
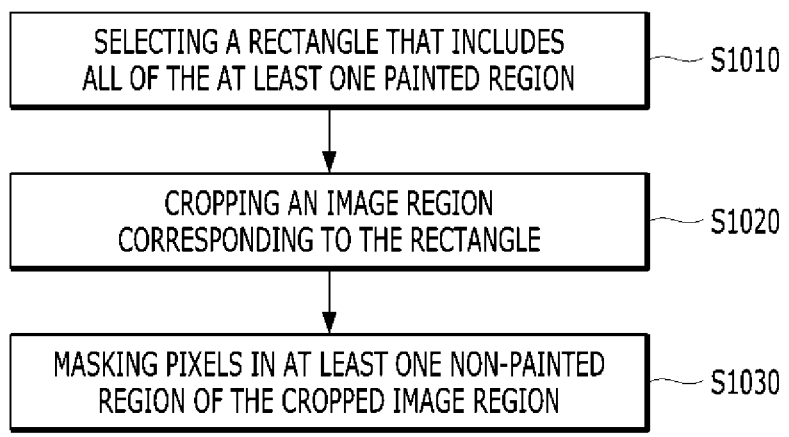
FIG. 10 illustrates an example flow diagram of a process to eliminate a background of region data, arranged in accordance with at least some embodiments described herein.

Referring back to FIG. 7, block S710 may be followed by block S720, "ELIMINATING BACKGROUND OF THE REFINED REGION DATA." At block S720, the one or more computing devices may eliminate background of the refined region data. A detailed example explaining the background elimination process is described with reference to FIG. 10 below. FIG. 10 illustrates an example flow diagram of a process to eliminate a background of region data, arranged in accordance with at least some embodiments described herein. A process 1000 of FIG. 10 may be implemented using one or more computing devices, for example, user device 110 or 200 described with reference to FIGS. 1 and 2 and/or server 130 or 300 described with reference to FIGS. 1 and 3. Process 1000 of FIG. 10 may begin at block S1010, "SELECTING A RECTANGLE THAT INCLUDES ALL OF THE AT LEAST ONE PAINTED REGION."

Figure 11A:
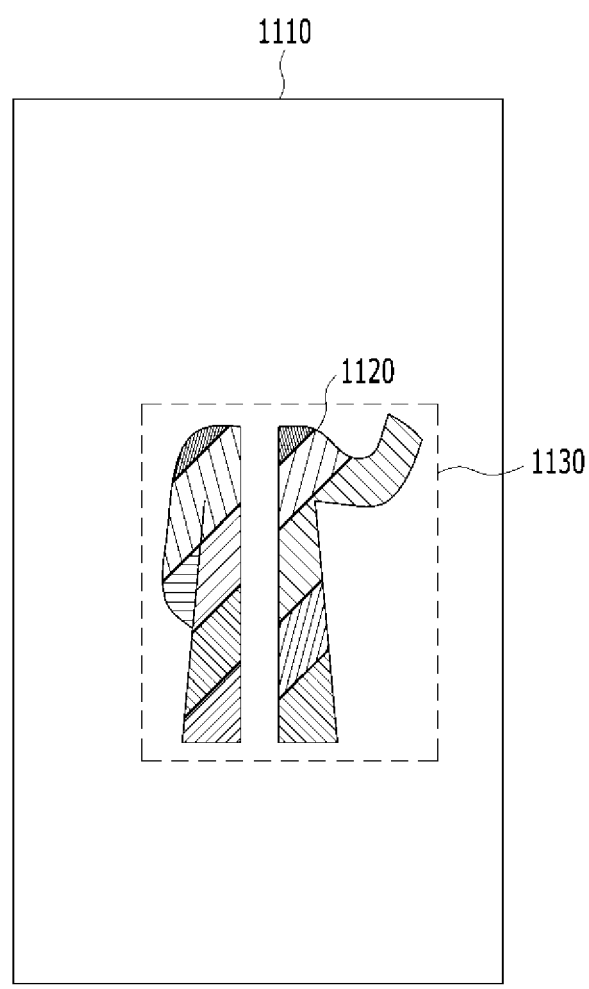
FIGS. 11A and 11B show illustrative examples of eliminating the background in accordance with the example flow diagram of FIG. 10.

At block S1010, the one or more computing devices may select a rectangle that includes all of the painted region. The rectangle may be a minimum rectangle that covers all of the painted region. Depending on a desired implementation, another shape than a rectangle may be used to select the painted region. As a non-limiting example, the selection of the minimum rectangle is described in more details with reference to an illustrative examples of FIG. 11A. As depicted in FIG. 11A, the refined region data 1110 may include at least one painted region 1120 (e.g., one or more segments selected by the refinement process). The rectangle 1130 may be selected to include all of at least one painted region 1120. Block S1010 may be followed by block S1020, "CROPPING AN IMAGE REGION CORRESPONDING TO THE RECTANGLE."

Figure 11B:
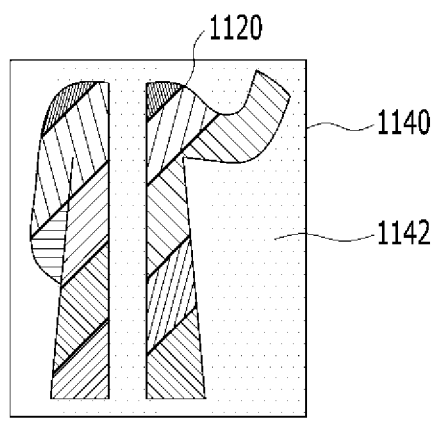

At block S1020, the one or more computing devices may crop an image region corresponding to the rectangle, in particular the minimum rectangle. In some examples, the one or more computing devices may crop an image corresponding to the refined region data with the minimum rectangle to generate a cropped image region. The cropped image region corresponding to the minimum rectangle has a smaller size than the refined region data and may be used for the next process. Block S1020 may be followed by block S1030, "MASKING PIXELS IN AT LEAST ONE NON-PAINTED REGION OF THE CROPPED IMAGE REGION." At block S1030, the one or more computing devices may mask pixels in at least one non-painted region of the cropped image region. In some examples, the one or more computing devices may mask pixels with a random value. As a non-limiting example, the cropping and masking are described in more details with reference to an illustrative examples of FIG. 11B. As depicted in FIG. 11B, the one or more computing devices may crop an image for the refined region data to generate a cropped image region 1140. Cropped image region 1140 may include at least one painted region 1120 (e.g., one or more segments selected by the refinement process) and a region 1142 other than the at least one painted region 1120. In some examples, the one or more computing devices may mask region 1142 (i.e., a non-painted region) with a random value. In some other examples, the region 1142 may be masked with a predetermined value rather than the random value.

While process 1000 of FIG. 10 has been described above with reference to blocks S1010, S1020 and S1030, the embodiments described herein are not limited thereto, and one or more blocks may be omitted, modified, or switched without departing from the spirit of the present disclosure.

Referring back to FIG. 7, block S720 may be followed by block S730, "EXTRACTING AT LEAST ONE FEATURE DATA FROM THE INPUT IMAGE BASED, AT LEAST IN PART, ON THE REFINED REGION DATA." At block S730, the one or more computing devices may extract at least one feature data from the input image using the region data after the preprocesses in blocks S710 and S720. In some examples, the one or more computing devices may extract the at least one feature data using a convolutional neural networks (CNN). Further, the one or more computing devices may hierarchically extract the at least one feature data. That is, the one or more computing devices may extract a raw feature vector and then extract more sophisticated feature vectors using the raw feature vector. In some examples, the at least one feature data may include a set of decimal fractions extracted from the input image. Block S730 may be followed by block S740, "TRANSFORMING THE AT LEAST ONE FEATURE DATA TO PRODUCE THE PREPROCESSED DATA."

Figure 12:
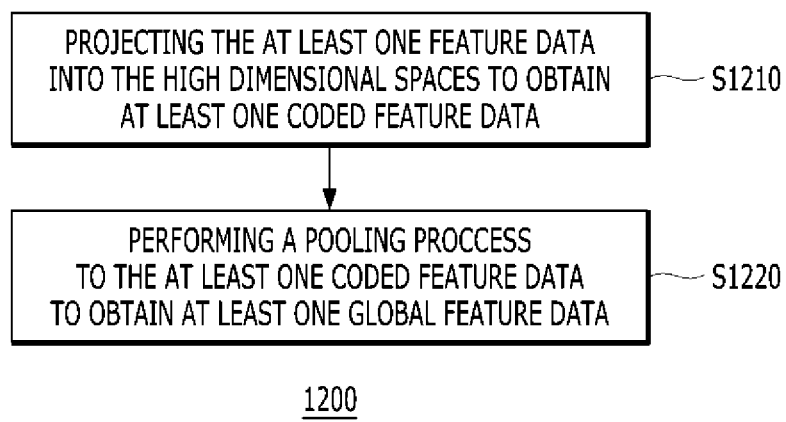
FIG. 12 illustrates an example flow diagram of a process to transform at least one feature data, arranged in accordance with at least some embodiments described herein.

At block S740, the one or more computing devices may transform the at least one feature data extracted at block S730 to produce the preprocessed data. A detailed example explaining the feature transformation is described with reference to FIG. 12 below, arranged in accordance with at least some embodiments described herein. FIG. 12 illustrates an example flow diagram of a process to transform at least one feature data, arranged in accordance with at least some embodiments described herein. A process 1200 of FIG. 12 may be implemented using one or more computing devices, for example, user device 110 or 200 described with reference to FIGS. 1 and 2 and/or server 130 or 300 described with reference to FIGS. 1 and 3. As depicted in FIG. 12, the at least one extracted feature data may be transformed using coding and pooling procedures. Process 1200 of FIG. 12 may begin at block S1210, "PROJECTING THE AT LEAST ONE FEATURE DATA INTO THE HIGH DIMENSIONAL SPACES TO OBTAIN AT LEAST ONE CODED FEATURE DATA."

At block S1210, the one or more computing devices may perform a coding procedure. The one or more computing devices may project the at least one feature data into high dimensional spaces to obtain at least one coded feature data. Block S1210 may be followed by block S1220, "PERFORMING A POOLING PROCESS TO THE AT LEAST ONE CODED FEATURE DATA TO OBTAIN AT LEAST ONE GLOBAL FEATURE DATA." By way of example, but not limitation, the pooling procedure may include an average pooling that calculates the average value of feature vector and/or a max pooling that choose the maximum values for each element of vectors.

While process 1200 of FIG. 12 has been described above with reference to blocks S1210 and S1220, the embodiments described herein are not limited thereto, and one or more blocks may be omitted, modified, or switched without departing from the spirit of the present disclosure.

Figure 13:
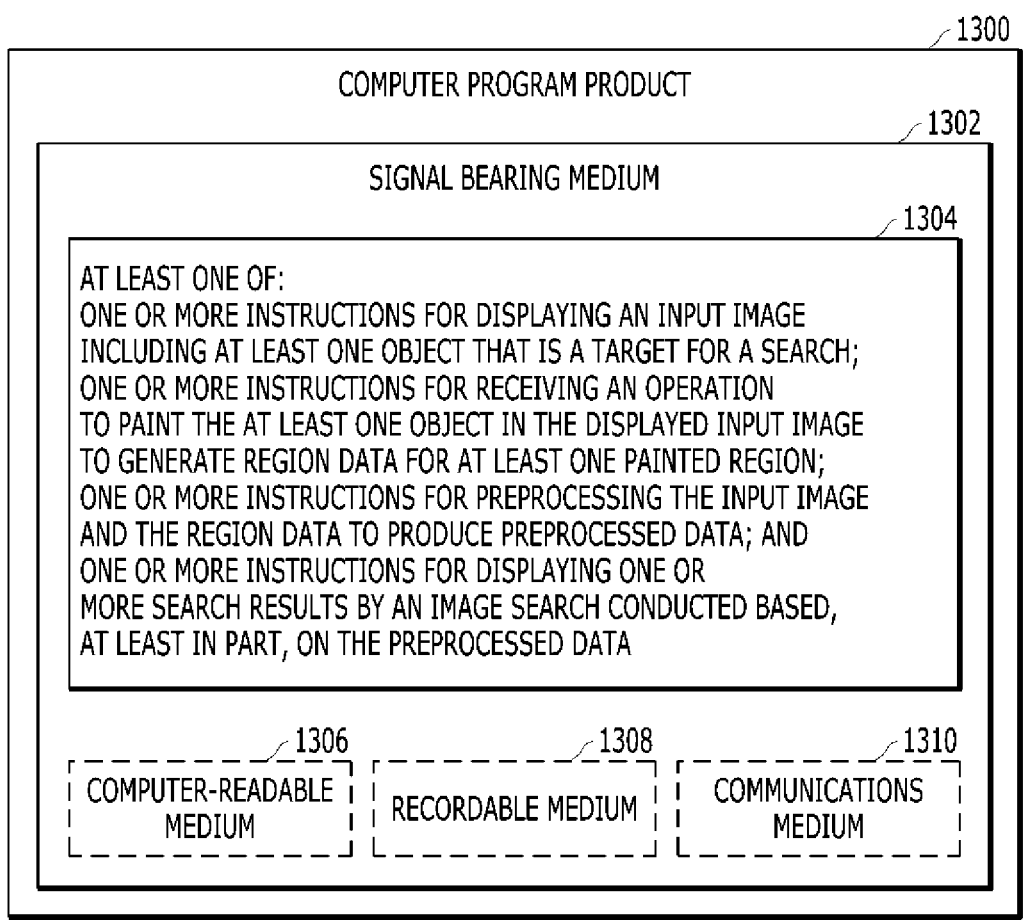
FIG. 13 illustrates a computer program product that may be utilized to perform an image search, arranged in accordance with at least some embodiments described herein.

FIG. 13 illustrates a computer program product 1300 that can be utilized to perform an image search, in accordance with at least some embodiments described herein. Computer program product 1300 may include a signal bearing medium 1302. Signal bearing medium 1302 may include one or more instructions 1304 that, in response to execution by, for example, one or more processors may provide the functionality and features described above with respect to FIGS. 1-12. By way of example, instructions 1304 may include at least one of: one or more instructions for displaying an input image including at least one object that is a target for a search; one or more instructions for receiving an operation to paint the at least one object in the displayed input image to generate region data for at least one painted region; one or more instructions for preprocessing the input image and the region data to produce preprocessed data; and one or more instructions for displaying one or more search results by an image search conducted based, at least in part, on the preprocessed data. Thus, for example, referring to FIGS. 1-3, user device 110 or 200 and/or server 130 or 300 may undertake one or more of the blocks shown in FIGS. 4, 7, 8, 10 and 12 in response to instructions 1304.

In some implementations, signal bearing medium 1302 may encompass a non-transitory computer-readable medium 1306, such as, but not limited to, a hard disk drive, a Compact Disc (CD), a Digital Video Disk (DVD), a digital tape, memory, etc. In some implementations, signal bearing medium 1302 may encompass a recordable medium 1308, such as, but not limited to, memory, read/write (R/W) CDs, R/W DVDs, etc. In some implementations, signal bearing medium 1302 may encompass a communications medium 1310, such as, but not limited to, a digital and/or an analog communication medium (e.g., a fiber optic cable, a waveguide, a wired communications link, a wireless communication link, etc.). Thus, for example, program product 1300 may be conveyed to one or more modules of a user device, such as for example, user device 110 or 200 by an RF signal bearing medium 1302, where the signal bearing medium 1302 is conveyed by a wireless communications medium 1310 (e.g., a wireless communications medium conforming with the IEEE 802.11 standard).

Figure 14:
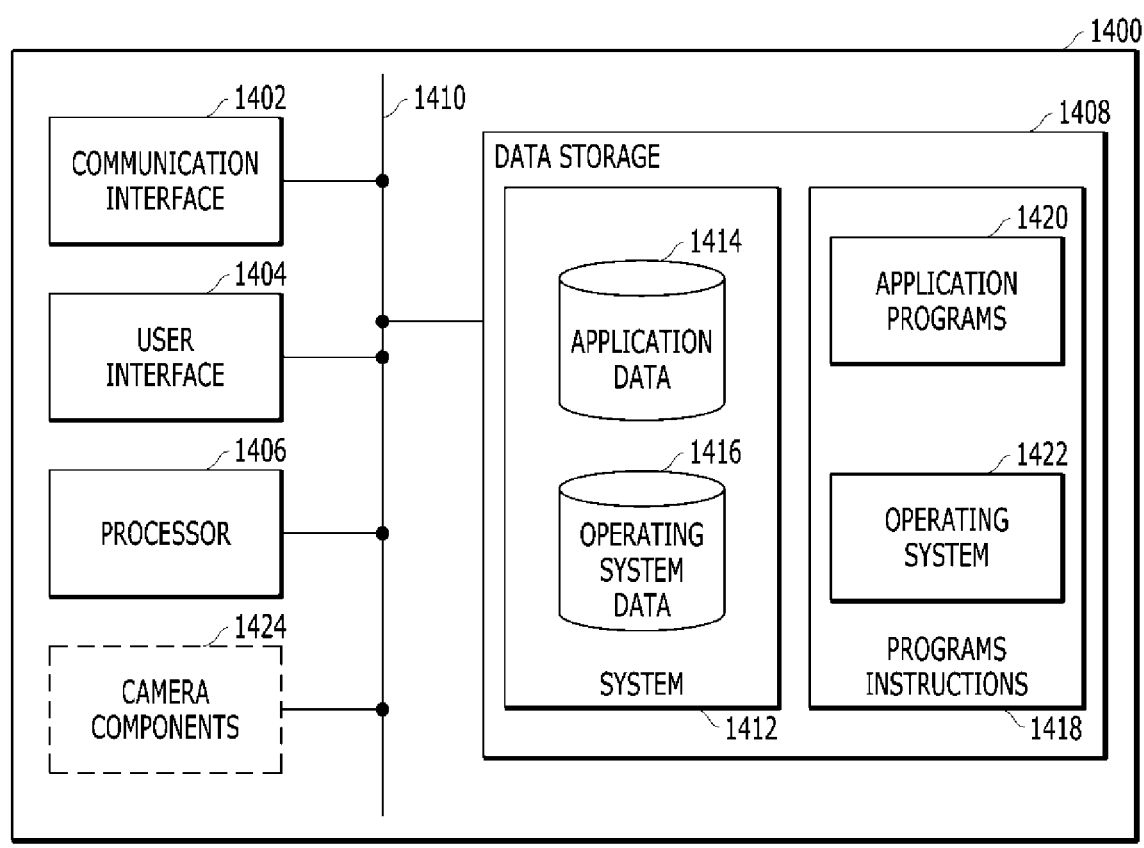
FIG. 14 shows a simplified block diagram of an example computing device that can be configured for an image search, arranged in accordance with at least some embodiments described herein.

FIG. 14 shows a simplified block diagram of an example computing device that can be configured for an image search. Computational functions (e.g., functions to receive a paint operation and to preprocess region data based on the paint operation) described herein may be performed by a computing system. Such a computing system may be integrated into or take the form of a computing device, such as a mobile phone, a tablet computer, a laptop computer, a server, a cloud computing network, and/or a programmable logic controller. For purposes of example, FIG. 14 is a simplified block diagram showing some of the components of an example computing device 1400. Additionally, the example computing device 1400 may include camera components 1424. Camera components 1424 may include multiple cameras, such as visible light cameras, or other types of cameras.

By way of example and without limitation, computing device 1400 may be a cellular mobile telephone (e.g., a smartphone), a computer (such as a desktop, notebook, tablet, or handheld computer), a personal digital assistant (PDA), a home automation component, a digital television, a remote control, a wearable computing device, a robot, a drone, an autonomous vehicle, or some other type of device that may be equipped with an image display and/or user input receiving capabilities.

As shown in FIG. 14, computing device 1400 may include a communication interface 1402, a user interface 1404, a processor 1406, a data storage 1408, and camera components 1424, all of which may be communicatively linked together by a system bus, a network, or other connection mechanism 1410.

Communication interface 1402 may function to allow computing device 1400 to communicate, using analog or digital modulation of electric, magnetic, electromagnetic, optical, or other signals, with other devices, access networks, and/or transport networks. Thus, communication interface 1402 may facilitate circuit-switched and/or packet-switched communication, such as plain old telephone service (POTS) communication and/or Internet protocol (IP) or other packetized communication. For instance, communication interface 1402 may include a chipset and antenna arranged for wireless communication with a radio access network or an access point. Also, communication interface 1402 may take the form of or include a wireline interface, such as an Ethernet, Universal Serial Bus (USB), or High-Definition Multimedia Interface (HDMI) port. Communication interface 1402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1402. Furthermore, communication interface 1402 may comprise multiple physical communication interfaces (e.g., a Wifi interface, a BLUETOOTH® interface, and a wide-area wireless interface).

In some embodiments, communication interface 1402 may function to allow computing device 1400 to communicate, with other devices, remote servers, access networks, and/or transport networks. For example, the communication interface 1402 may function to access input image and/or access an image database via communication with a remote server or other remote device or system in order to allow the computing device 1400 to display an input image, receive a paint operation on the displayed input image to generate region data, preprocess the region data to produce the preprocessed data and/or conduct a search of the image database. Additionally, computing device 1400 could include cameras, or other image capture devices, configured to capture an image as the input image.

User interface 1404 may function to allow computing device 1400 to interact with a user, for example to receive input from and/or to provide output to the user. Thus, user interface 1404 may include input components such as a keypad, keyboard, touch-sensitive or presence-sensitive panel, computer mouse, trackball, joystick, and so on. User interface 1404 may also include one or more output components such as a display screen which, for example, may be combined with a presence-sensitive panel. The display screen may be based on CRT, LCD, and/or LED technologies, or other technologies now known or later developed.

In some embodiments, user interface 1404 may include a display screen that display the input image and user painted region on the input image. Additionally, user interface 1404 may include one or more buttons, switches, knobs, and/or dials that facilitate the configuration of the display. It may be possible that some or all of these buttons, switches, knobs, and/or dials are implemented as functions on a touch- or presence-sensitive panel. User interface 1404 may be configured to permit a user to input an operation to paint at least one object in the displayed input image.

Processor 1406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other applications or functions. Data storage 1408 may include one or more volatile and/or non-volatile storage components, such as magnetic, optical, flash, or organic storage, and may be integrated in whole or in part with processor 1406. Data storage 1408 may include removable and/or non-removable components.

Processor 1406 may be capable of executing program instructions 1418 (e.g., compiled or non-compiled program logic and/or machine code) stored in data storage 1408 to carry out the various functions described herein. Therefore, data storage 1408 may include a non-transitory computer-readable medium, having stored thereon program instructions that, upon execution by computing device 1400, cause computing device 1400 to carry out any of the methods, processes, or functions disclosed in this specification and/or the accompanying drawings. The execution of program instructions 1418 by processor 1406 may result in processor 1406 using data 1412.

By way of example, program instructions 1418 may include an operating system 1422 (e.g., an operating system kernel, device driver(s), and/or other modules) and one or more application programs 1420 (e.g., camera functions, address book, email, web browsing, ecommerce functions, social networking, and/or gaming applications) installed on computing device 1400. Similarly, data 1412 may include operating system data 1416 and application data 1414. Operating system data 1416 may be accessible primarily to operating system 1422, and application data 1414 may be accessible primarily to one or more of application programs 1420. Application data 1414 may be arranged in a file system that is visible to or hidden from a user of computing device 1400.

Application programs 1420 may communicate with operating system 1422 through one or more application programming interfaces (APIs). These APIs may facilitate, for instance, application programs 1420 reading and/or writing application data 1414, transmitting or receiving information via communication interface 1402, receiving and/or displaying information on user interface 1404, and so on.

The displaying of an input image, the receiving of an operation to paint at least one object in the displayed input image to generate the region data, the preprocessing of the input image and the region data, and/or the conducting of a search of an image database could be performed by one or more components of processor 1406 (e.g., by one or more digital signal processors (DSPs), graphics processing units (GPUs), central processing units (CPUs), floating point units (FPUs), application-specific integrated circuits (ASICs), some other type of computational component, and/or some combination of one or more types of computational components, of processor 1406). For example, certain operations related to the receiving of the operation could be performed by a first computational element or type of computational element (e.g., DSPs, GPUs) of the processor 1406 and other certain operations related to the preprocessing could be performed by a second computational element or type of computational element (e.g., a general-purpose CPU) of the processor 1406.

Application programs 1420 may take the form of "apps" that could be downloadable to computing device 1400 through one or more online application stores or application markets (via, e.g., the communication interface 1402). However, application programs can also be installed on computing device 1400 in other ways, such as via a web browser or through a physical interface (e.g., a USB port) of the computing device 1400.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only, and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:
1. A method comprising:
  displaying, using one or more computing devices, an input image including at least one object;
  receiving, using the one or more computing devices, an operation to paint the at least one object in the displayed input image to generate region data for at least one painted region;
  preprocessing, using the one or more computing devices, the input image and the region data to produce preprocessed data, the preprocessing including:
    refining, using the one or more computing devices, the region data to produce refined region data and at least one of:
    eliminating, using the one or more computing devices, background of the refined region data;
    extracting, using the one or more computing devices, at least one feature data from the input image based, at least in part, on the refined region data; and
    transforming, using the one or more computing devices, the at least one feature data to produce the preprocessed data; and
  conducting, using the one or more computing devices, a search of an image database based, at least in part, on the preprocessed data.

2. The method of claim 1, wherein the preprocessing includes extracting at least one feature data from the input image based, at least in part, on the region data.

3. The method of claim 1, wherein the refining includes:
  segmenting, using the one or more computing devices, the input image into a plurality of segments; and
  selecting, using the one or more computing devices, one or more of the plurality of segments based on the region data to produce the refined region data.

4. The method of claim 1, wherein the eliminating includes:
  selecting a minimum rectangle that includes all of the at least one painted region;
  cropping an image region corresponding to the minimum rectangle; and
  masking pixels in at least one non-painted region of the cropped image region.

5. The method of claim 1, further comprising:
  storing, using the one or more computing devices, at least one of the input image, the region data and one or more search results.

6. The method of claim 1, wherein the receiving of the operation includes determining end of the operation based, at least in part, on a user input.

7. The method of claim 1, wherein the preprocessed data includes at least one of vectors, graphs and images.

8. A computing device comprising:
  at least one processor; and
  at least one memory storing instructions that, when executed by the at least one processor, cause the at least one processor to perform operations comprising:
    obtaining an input image including at least one object that is a target for a search;
    displaying the input image on a display screen associated with the computing device;
    receiving an operation to paint the at least one object in the displayed input image to generate region data for at least one painted region;
    preprocessing the input image and the region data to produce preprocessed data., further including:
      refining the region data to produce refined region data and at least one of:
      eliminating background of the refined region data;
      extracting at least one feature data from the input image based, at least in part, on the refined region data; and transforming the at least one feature data to produce the preprocessed data; and displaying, on the display screen, one or more search results by an image search conducted based, at least in part, on the input image and the region data.

9. The computing device of claim 8, wherein the preprocessing includes:

extracting at least one feature data from the input image based, at least in part, on the region data.

10. The computing device of claim 8, wherein the operations further comprising:

transmitting, to a second computing device, the preprocessed data; and receiving, from the second computing device, the one or more search results obtained by the second computing device.

11. The computing device of claim 8, wherein the operations further comprising:

transmitting, to a second computing device, the input image and the region image; and receiving, from the second computing device, the one or more search results obtained by the second computing device.

12. The computing device of claim 8, wherein the receiving of the operation includes determining end of the operation based, at least in part, on a user input.

13. A non-transitory computer-readable storage medium having stored therein instructions executable by a computing device to cause the computing device to perform operations comprising:

displaying an input image including at least one object that is a target for a search;

receiving an operation to paint the at least one object in the displayed input image to generate region data for at least one painted region;

preprocessing, using the one or more computing devices, the input image and the region data to produce preprocessed data, the preprocessing including:

refining, using the one or more computing devices, the region data to produce refined region data and at least one of:

eliminating, using the one or more computing devices, background of the refined region data;

extracting, using the one or more computing devices, at least one feature data from the input image based, at least in part, on the refined region data; and transforming, using the one or more computing devices, the at least one feature data to produce the preprocessed data; and displaying one or more search results by an image search conducted based, at least in part, on the preprocessed data.

14. The non-transitory computer-readable storage medium of claim 13, wherein the receiving of the operation includes determining end of the operation based, at least in part, on a user input.

15. The non-transitory computer-readable storage medium of claim 13, wherein the preprocessing includes extracting at least one feature data from the input image based, at least in part, on the region data.

16. The non-transitory computer-readable storage medium of claim 13, wherein the operations further comprising:

conducting the image search based, at least in part, on the preprocessed data to obtain the one or more search results.

* * * * *